US012488597B2

(12) United States Patent
Lee et al.

(10) Patent No.: US 12,488,597 B2
(45) Date of Patent: Dec. 2, 2025

(54) END-TO-END MONOCULAR 2D SEMANTIC KEYPOINT DETECTOR AND TRACKER LEARNING

(71) Applicant: TOYOTA RESEARCH INSTITUTE, INC., Los Altos, CA (US)

(72) Inventors: Kuan-Hui Lee, San Jose, CA (US);
Kun-Hsin Chen, Mountain View, CA (US); Haofeng Chen, Stanford, CA (US); Arjun Bhargava, San Francisco, CA (US); Sudeep Pillai, Santa Clara, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 510 days.

(21) Appl. No.: 17/167,570

(22) Filed: Feb. 4, 2021

(65) Prior Publication Data

US 2022/0245387 A1  Aug. 4, 2022

(51) Int. Cl.
| | |
|---|---|
| *G06V 20/40* | (2022.01) |
| *B60W 60/00* | (2020.01) |
| *G06F 16/901* | (2019.01) |
| *G06N 3/04* | (2023.01) |
| *G06V 20/58* | (2022.01) |

(52) U.S. Cl.
CPC ..... *G06V 20/584* (2022.01); *B60W 60/00274* (2020.02); *G06F 16/9024* (2019.01); *G06N 3/04* (2013.01); *G06V 20/41* (2022.01); *B60W 2554/80* (2020.02)

(58) Field of Classification Search
CPC ...... G06V 20/584; G06V 20/41; G06V 10/44; G06V 10/82; G06V 10/86; G06V 20/54; G06V 20/58; B60W 60/00274; B60W 2554/80; B60W 2420/42; B60W 2554/40; B60W 60/0027; G06F 16/9024; G06F 16/7837; G06N 3/04; G06N 3/08; G06N 3/045

See application file for complete search history.

(56) References Cited

U.S. PATENT DOCUMENTS

| | | | |
|---|---|---|---|
| 2019/0220991 A1 | 7/2019 | Holzer et al. | |
| 2020/0010077 A1* | 1/2020 | Cormack | B60W 40/08 |
| 2021/0150252 A1* | 5/2021 | Sarlin | G06F 18/213 |

OTHER PUBLICATIONS

Reddy, N. Dinesh, Minh Vo, and Srinivasa G. Narasimhan. "Occlusion-net: 2d/3d occluded keypoint localization using graph networks." Proceedings of the IEEE/CVF Conference on Computer Vision and Pattern Recognition. 2019. (Year: 2019).*

(Continued)

*Primary Examiner* — Amandeep Saini
*Assistant Examiner* — Denise G Alfonso
(74) *Attorney, Agent, or Firm* — SEYFARTH SHAW LLP (57) ABSTRACT

A method for semantic keypoint detection is described. The method includes linking, using a keypoint graph neural network (KGNN), semantic keypoints of an object within a first image of a video stream into a 2D graph structure corresponding to a category of the object. The method also includes embedding descriptors within the semantic keypoints of the 2D graph structure corresponding to the category of the object. The method further includes tracking the object within subsequent images of the video stream using the embedded descriptors within the semantic keypoints of the 2D graph structure corresponding to the category of the object.

14 Claims, 6 Drawing Sheets

(56) References Cited

OTHER PUBLICATIONS

Choi, Wongun. "Near-online multi-target tracking with aggregated local flow descriptor." Proceedings of the IEEE international conference on computer vision. 2015. (Year: 2015).*
Lee, Kibeom, and Dongsuk Kum. "Collision avoidance/mitigation system: Motion planning of autonomous vehicle via predictive occupancy map." IEEE Access 7 (2019): 52846-52857. (Year: 2019).*
Hayakawa, Jun, and Behzad Dariush. "Ego-motion and surrounding vehicle state estimation using a monocular camera." 2019 IEEE Intelligent Vehicles Symposium (IV). IEEE, 2019. (Year: 2019).*
Shah, Jitendra, et al. "Autonomous rear-end collision avoidance using an electric power steering system." Proceedings of the Institution of Mechanical Engineers, Part D: Journal of Automobile Engineering 229.12 (2015): 1638-1655. (Year: 2015).*
Liu, Guiqing, and Jinzhao Wu. "Video-based person re-identification by intra-frame and inter-frame graph neural network." Image and Vision Computing 106 (2020): 104068. (Year: 2020).*
Wang, Yongxin, Kris Kitani, and Xinshuo Weng. "Joint Object Detection and Multi-Object Tracking with Graph Neural Networks." arXiv preprint arXiv:2006.13164 (2020). (Year: 2020).*
DeTone, Daniel, et al. "Superglue: Learning feature matching with graph neural networks." Proceedings of the IEEE/CVF conference on computer vision and pattern recognition. 2020. (Year: 2020).*
Dong, et al., "Supervision-by-Registration: An Unsupervised Approach to Improve the Precision of Facial Landmark Detectors," arXiv:1807.00966v2, Jul. 4, 2018.
Chang, et al., "CLKN: Cascaded Lucas-Kanade Networks for Image Alignment," IEEE Conference on Computer Vision and Pattern Recognition (CVPR), Jul. 2017.
Tang, et al., "Neural Outlier Rejection for Self-Supervised Keypoint Learning," arXiv:1912.10615v1, Dec. 23, 2019.
Wang, et al., "Deep-LK for Efficient Adaptive Object Tracking," arXiv:1705.06839v2, May 30, 2017.
Weng, et al., "Deep-LK for Efficient Adaptive Object Tracking," arXiv:1811.11325v4, May 21, 2019.
Misra, et al., "Dual approach for object tracking based on optical flow and swarm intelligence," arXiv:1808.08186v1, Aug. 15, 2018.
Li, et al., "Deterministic PointNetLK for Generalized Registration," arXiv:2008.09527v1, Aug. 21, 2020.
Aoki, et al., "PointNetLK Robust & Efficient Point Cloud Registration using PointNet," arXiv:1903.05711v2, Apr. 4, 2019.

\* cited by examiner

END-TO-END MONOCULAR 2D SEMANTIC KEYPOINT DETECTOR AND TRACKER LEARNING

BACKGROUND

Field

Certain aspects of the present disclosure generally relate to machine learning and, more particularly, a system and method for end-to-end monocular 2D semantic keypoint detector and tracker learning.

Background

Autonomous agents (e.g., vehicles, robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

In operation, autonomous agents may rely on a trained convolutional neural network (CNN) to identify objects within areas of interest in an image of a surrounding scene of the autonomous agent. For example, a CNN may be trained to identify and track objects captured by one or more sensors, such as light detection and ranging (LIDAR) sensors, sonar sensors, red-green-blue (RGB) cameras, RGB-depth (RGB-D) cameras, and the like. The sensors may be coupled to, or in communication with, a device, such as an autonomous vehicle. Object detection applications for autonomous vehicles may analyze sensor image data for detecting objects in the surrounding scene from the autonomous agent.

Autonomous agents, such as driverless cars and robots, are quickly evolving and have become a reality in this decade. Detecting interest points in RGB images and matching them across views is a fundamental capability of many robotic systems. Unfortunately, conventional autonomous systems assume that salient keypoints can be detected and re-identified in diverse settings, which involves strong invariance to lighting, viewpoint changes, scale, etc. Until recently, these tasks have mostly relied on hand-engineered keypoint features, which have limited performance. That is, detecting semantic keypoint images to enable learned tracing from a monocular video stream is desired.

SUMMARY

A method for semantic keypoint detection is described. The method includes linking, using a keypoint graph neural network (KGNN), semantic keypoints of an object within a first image of a video stream into a 2D graph structure corresponding to a category of the object. The method also includes embedding descriptors within the semantic keypoints of the 2D graph structure corresponding to the category of the object. The method further includes tracking the object within subsequent images of the video stream using the embedded descriptors within the semantic keypoints of the 2D graph structure corresponding to the category of the object.

A non-transitory computer-readable medium having program code recorded thereon for semantic keypoint detection is described. The program code is executed by a processor. The non-transitory computer-readable medium includes program code to link, using a keypoint graph neural network (KGNN), semantic keypoints of an object within a first image of a video stream into a 2D graph structure corresponding to a category of the object. The non-transitory computer-readable medium also includes program code to embed descriptors within the semantic keypoints of the 2D graph structure corresponding to the category of the object. The non-transitory computer-readable medium further includes program code to track the object within subsequent images of the video stream using embedded descriptors within the semantic keypoints of the 2D graph structure corresponding to the category of the object.

A system for semantic keypoint detection is described. The system includes a semantic keypoint detection module to link, using a keypoint graph neural network (KGNN), semantic keypoints of an object within a first image of a video stream into a 2D graph structure corresponding to a category of the object. The system also includes a semantic keypoint descriptor module to embed descriptors within the semantic keypoints of the 2D graph structure corresponding to the category of the object. The system further includes a semantic keypoint tracking module to track the object within subsequent images of the video stream using embedded descriptors within the semantic keypoints of the 2D graph structure corresponding to the category of the object.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Tracking of interest points within frames of a monocular video stream is an important perception task in the area of autonomous agents, such as driverless cars and robots. Detecting interest points in red-green-blue (RGB) images and matching them across views is a fundamental capability of many robotic systems. Tasks such as structure-from-motion (SfM) and/or simultaneous localization and mapping (SLAM) assume that salient keypoints can be detected and re-identified in diverse settings. Until recently, these tasks have mostly relied on hand-engineered keypoint features, which have limited performance.

As described, semantic keypoints are points of interest with semantic meaning for objects in an image. For example, the right front taillight of a car, the left back taillight of the car, the front left tire hub of the car, and other like features of the car. Keypoints may represent interest points that are more low-level points that may not have clear semantic meaning, such as a corner point or ending point of a line segment. The keypoints may be detected using a keypoint heat map. As described, a keypoint heatmap identifies broad regions of an image where a keypoint is likely found based on a final prediction. In some aspects of the present disclosure, a keypoint graph neural network (KGNN) is configured to link keypoints in a 2D graph structure representing an object category of an object in a frame (T) of a video stream.

Aspects of the present disclosure include a method for semantic keypoint detection and linking of the semantic keypoints in a graph structure for tracking an object within subsequent frames of a video stream. For example, this method includes estimating a geometric structure of an object. In some aspects of the present disclosure, the geometric structure provides a rigid-body model of an object (e.g., a vehicle) for enabling tracking of the vehicle between frames of the video stream. This method also includes tracking object motion between frames of the video stream using the geometric structure of the object. In some aspects of the present disclosure, the directed graph provides the geometric structure according to a conditioned structure of the object according to a rigid-body model.

One aspect of the present disclosure is directed to an approach for learning an end-to-end 2D semantic keypoint detector and tracker using a shared, differentiable keypoint-flow layer. In particular, the present disclosure proposes an end-to-end learning framework for semantic keypoint detection and tracking. The model architecture is composed of a differentiable 2D detector and tracker that are trained in an end-to-end supervised fashion. A keypoint model architecture includes a detector head and descriptor head that are trained jointly from ground truth semantic keypoint annotations on video sequences. The detector head is composed of a semantic keypoint detector head (or decoder) that is supervised using ground truth semantic keypoint annotations provided by a human labeler at a frame-level.

In one aspect of the present disclosure, a semantic keypoint detection and learned tracking system is composed of a shared image backbone. For example, the shared image backbone extracts relevant appearance and geometric features for semantic keypoint extraction by generating a keypoint heatmap. In some aspects of the present disclosure, the disclosed architecture, further includes modeling the detected keypoints by a structured graph neural network to depict the geometry/spatial relationships of a rigid-body object (ex: Car, Bus, Truck, etc.). This graph model can be either predefined as prior, or learned in the proposed end-to-end framework. As such, this aspect of the present disclosure adds a graphical representation/model to constrain the geometry between the keypoints in a rigid object, such as a directed keypoint graph. In some aspects of the present disclosure, the structured graph neural network is a keypoint graph neural network (KGNN).

In some aspects of the present disclosure, the keypoint descriptor head is trained in a differentiable manner by leveraging a differentiable keypoint flow model. In one aspect of the present disclosure, the differentiable keypoint flow network is a Lucas-Kanade (LK) layer configured to associate the semantic keypoints across subsequent frames of a video stream. While the differentiable keypoint flow network is not explicitly trained, the keypoint descriptor head is further refined to enable robust tracking via descriptor embedding produced by the differentiable keypoint-flow model.

Figure 1:
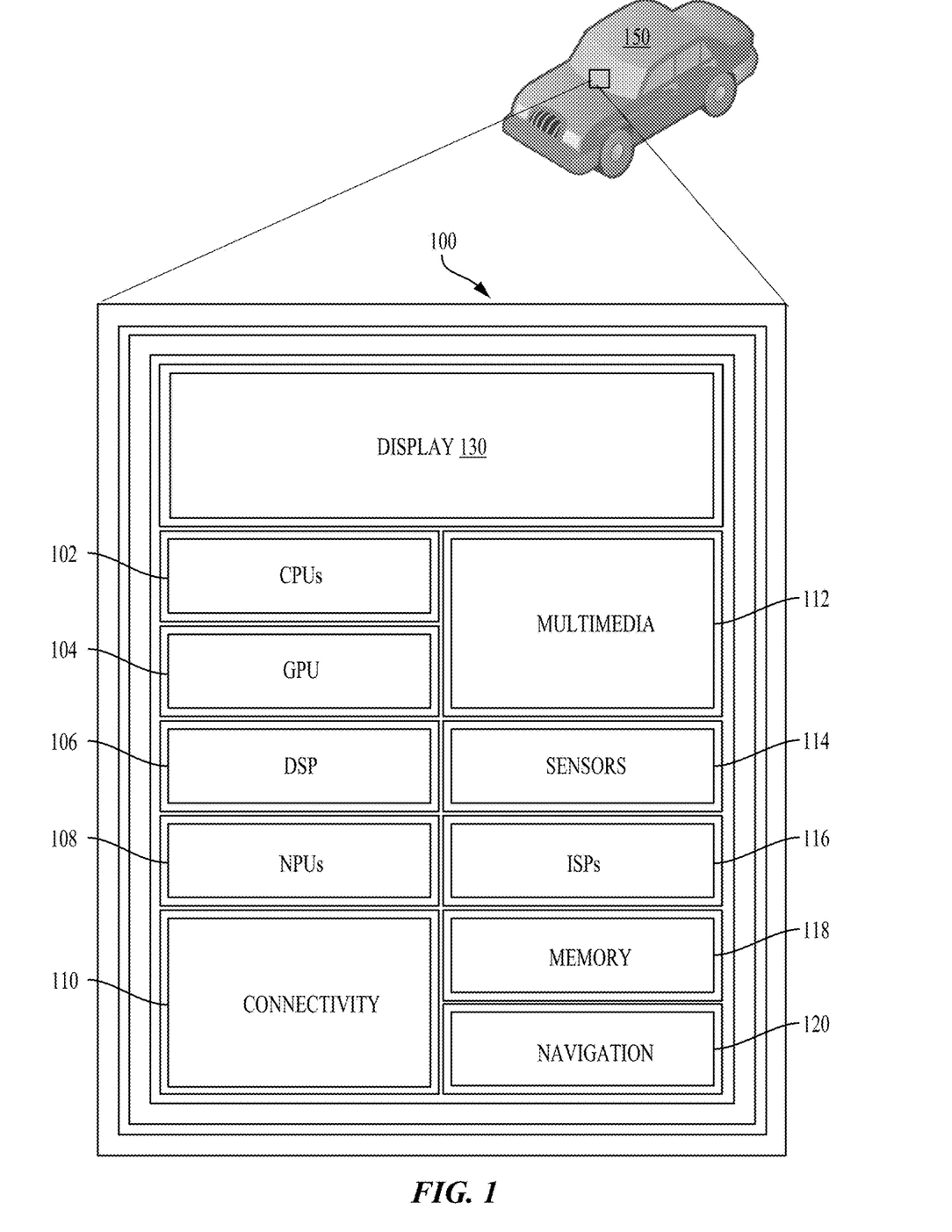
FIG. 1 illustrates an example implementation of designing a system using a system-on-a-chip (SOC) for semantic keypoint detection and learned tracking, in accordance with aspects of the present disclosure.

FIG. 1 illustrates an example implementation of the aforementioned system and method for semantic keypoint detection and learned tracking using a system-on-a-chip (SOC) 100 of an ego vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize semantic keypoints of objects in an area of interest, according to the display 130 illustrating a view of a vehicle. In some aspects of the present disclosure, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system (GPS).

The SOC 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for monocular visual odometry in an image captured by the sensor processor 114. The instructions loaded into a processor (e.g., CPU 102) may also include code for planning and control (e.g., intention prediction of the ego vehicle) in response to detecting ego-motion of the ego vehicle based on an image captured by the sensor processor 114.

Figure 2:
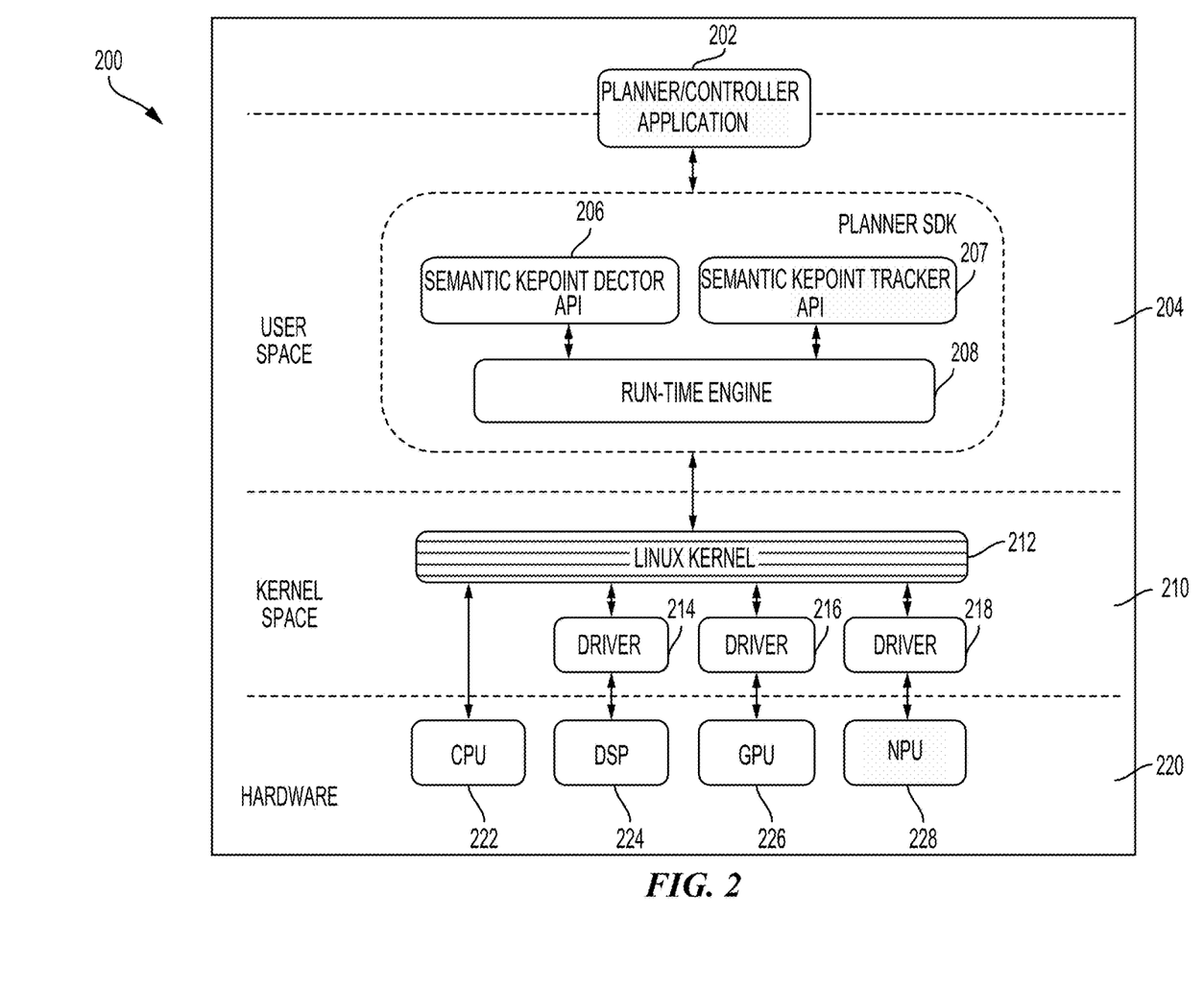
FIG. 2 is a block diagram illustrating a software architecture that may modularize functions for semantic keypoint detection and linking of the semantic keypoints for learned tracking, according to aspects of the present disclosure.

FIG. 2 is a block diagram illustrating a software architecture 200 that may modularize functions for detecting and tracking semantic keypoints in subsequent frames of a video stream, according to aspects of the present disclosure. Using the architecture, a planner/controller application 202 may be designed to cause various processing blocks of a system-on-a-chip (SOC) 220 (for example a CPU 222, a DSP 224, a GPU 226, and/or an NPU 228) to perform supporting computations during run-time operation of the planner/controller application 202.

The planner/controller application 202 may be configured to call functions defined in a user space 204 that may, for example, provide for tracking semantic keypoints in subsequent frames of a video stream captured by a monocular camera of an ego vehicle. The planner/controller application 202 may make a request to compile program code associated with a library defined in a semantic keypoint detector application programming interface (API) 206 for semantic keypoint detection. The planner/controller application 202 may make a request to compile program code associated with a library defined in a semantic keypoint tracker API 207 for the task of tracking semantic keypoints in subsequent frames of a video stream captured by an autonomous agent.

A run-time engine 208, which may be compiled code of a run-time framework, may be further accessible to the planner/controller application 202. The planner/controller application 202 may cause the run-time engine 208, for example, to perform tracking of detecting semantic keypoints in subsequent frames of a monocular (single-camera) video stream. When an object is detected within a predetermined distance of the ego vehicle, the run-time engine 208 may, in turn, send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
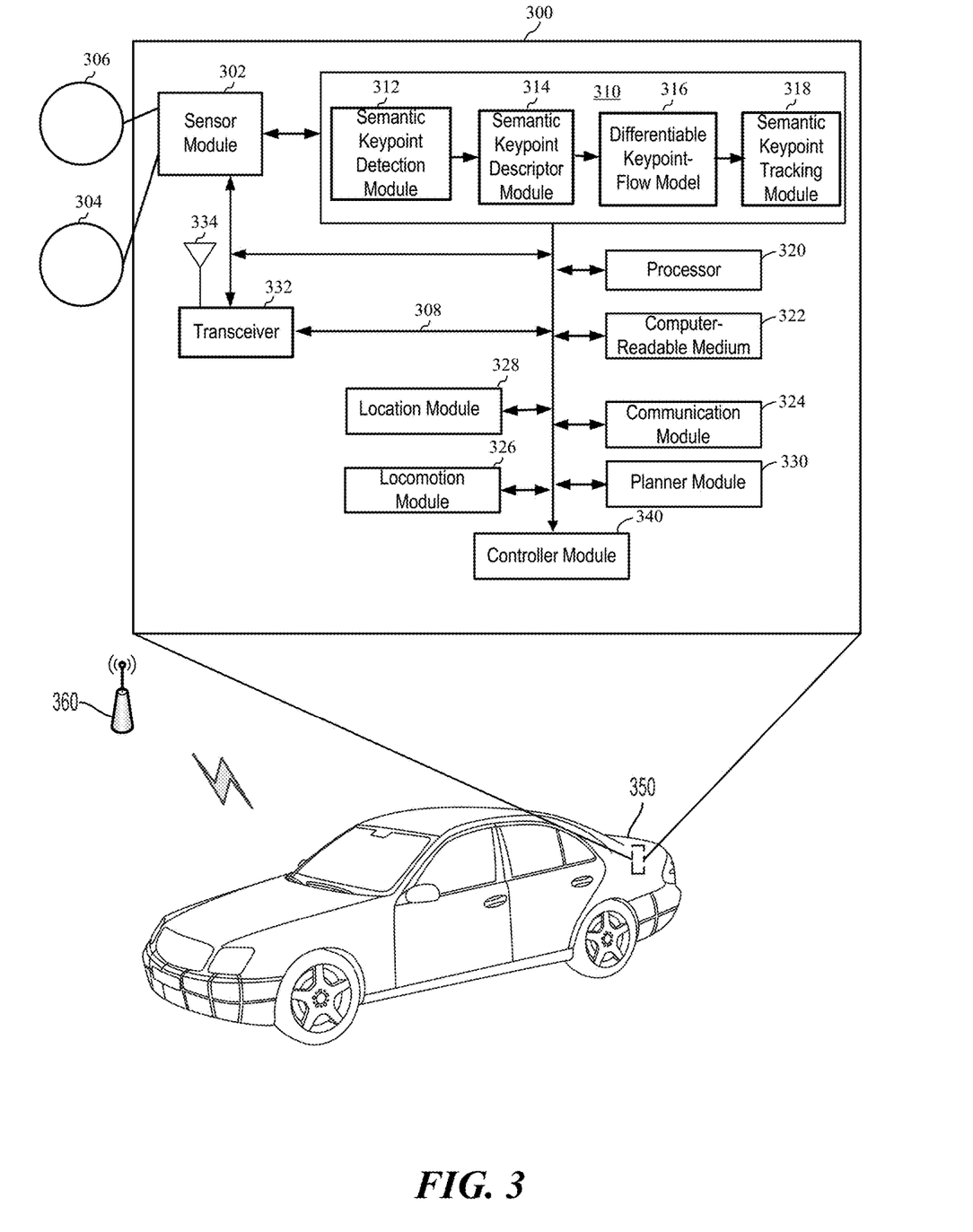
FIG. 3 is a diagram illustrating an example of a hardware implementation for a semantic keypoint detection and learned tracking system, according to aspects of the present disclosure.

FIG. 3 is a diagram illustrating an example of a hardware implementation for a semantic keypoint detection and tracking system 300, according to aspects of the present disclosure. The semantic keypoint detection and tracking system 300 may be configured for planning and control of an ego vehicle in response to keypoint tracking within subsequent frames of monocular (single-camera) video stream captured during operation of a car 350. The semantic keypoint detection and tracking system 300 may be a component of a vehicle, a robotic device, or other device. For example, as shown in FIG. 3, the semantic keypoint detection and tracking system 300 is a component of the car 350. Aspects of the present disclosure are not limited to the semantic keypoint detection and tracking system 300 being a component of the car 350, as other devices, such as a bus, motorcycle, or other like vehicle, are also contemplated for using the semantic keypoint detection and tracking system 300. The car 350 may be autonomous or semi-autonomous.

The semantic keypoint detection and tracking system 300 may be implemented with an interconnected architecture, represented generally by an interconnect 308. The interconnect 308 may include any number of point-to-point interconnects, buses, and/or bridges depending on the specific application of the semantic keypoint detection and tracking system 300 and the overall design constraints of the car 350. The interconnect 308 links together various circuits including one or more processors and/or hardware modules, represented by a sensor module 302, an ego perception module 310, a processor 320, a computer-readable medium 322, communication module 324, a locomotion module 326, a location module 328, a planner module 330, and a controller module 340. The interconnect 308 may also link various other circuits such as timing sources, peripherals, voltage regulators, and power management circuits, which are well known in the art, and therefore, will not be described any further.

The semantic keypoint detection and tracking system 300 includes a transceiver 332 coupled to the sensor module 302, the ego perception module 310, the processor 320, the computer-readable medium 322, the communication module 324, the locomotion module 326, the location module 328, a planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit detected 3D objects and/or planned actions from the ego perception module 310 to a server (not shown).

The semantic keypoint detection and tracking system 300 includes the processor 320 coupled to the computer-readable medium 322. The processor 320 performs processing, including the execution of software stored on the computer-readable medium 322 to provide keypoint tracking functionality, according to the present disclosure. The software, when executed by the processor 320, causes the semantic keypoint detection and tracking system 300 to perform the various functions described for ego vehicle perception based on semantic keypoint tracking between frames from video captured by a single-camera of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing 2D RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306.

The images of the first sensor 304 and/or the second sensor 306 may be processed by the processor 320, the sensor module 302, the ego perception module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, detected 3D object information captured by the first sensor 304 and/or the second sensor 306 may be transmitted via the transceiver 332. The first sensor 304 and the second sensor 306 may be coupled to the car 350 or may be in communication with the car 350.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication—Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A DSRC-compliant GPS unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the parking space of the car 350. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, fifth generation (5G) new radio (NR), long term evolution (LTE), third generation (3G), etc. The communication module 324 may also communicate with other components of the car 350 that are not modules of the semantic keypoint detection and tracking system 300. The transceiver 332 may be a communications channel through a network access point 360. The communications channel may include dedicated short-range communication (DSRC), long term evolution (LTE), LTE-driver-to-driver (D2D), mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, dedicated short-range communication (DSRC), full-duplex wireless communications, mmWave, Wi-Fi (infrastructure mode), Wi-Fi (ad-hoc mode), visible light communication, TV white space communication, and satellite communication. The network access point 360 may also include a mobile data network that may include 3G, 4G, 5G, LTE, LTE-vehicle-to-everything (V2X), LTE-driver-to-driver (D2D), Voice over long term evolution (VoLTE), or any other mobile data network or combination of mobile data networks. Further, the network access point 360 may include one or more Institute of Electrical and Electronics Engineers (IEEE) 802.11 wireless networks.

The semantic keypoint detection and tracking system 300 also includes the planner module 330 for planning a selected route/action (e.g., collision avoidance) of the car 350 and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and an HAV.

The ego perception module 310 may be in communication with the sensor module 302, the processor 320, the computer-readable medium 322, the communication module 324, the locomotion module 326, the location module 328, the planner module 330, the transceiver 332, and the controller module 340. In one configuration, the ego perception module 310 receives sensor data from the sensor module 302. The sensor module 302 may receive the sensor data from the first sensor 304 and the second sensor 306. According to aspects of the present disclosure, the ego perception module 310 may receive sensor data directly from the first sensor 304 or the second sensor 306 to perform monocular ego-motion estimation from images captured by the first sensor 304 or the second sensor 306 of the car 350.

Tracking of interest points within frames of a monocular video stream is an important perception task in the area of autonomous agents, such as autonomous operation of the car 350. Detecting interest points in red-green-blue (RGB) images and matching them across views is a fundamental capability of many robotic systems. As described, semantic keypoints are points of interest with semantic meaning for objects in an image. For example, the right front taillight of a car, the left back taillight of the car, the front left tire hub of the car, and other like features of the car.

Keypoints may represent interest points that are more low-level points that may not have clear semantic meaning, such as a corner point or ending point of a line segment. The keypoints may be detected using a keypoint heat map. As described, a keypoint heatmap identifies broad regions of an image where a keypoint is likely found based on a final prediction. In some aspects of the present disclosure, a keypoint graph neural network (KGNN) is configured to link keypoints in a 2D graph structure representing an object category of an object in a frame (T) of a video stream.

As shown in FIG. 3, the ego perception module 310 includes a semantic keypoint detection module 312, a semantic keypoint descriptor module 314, a differentiable keypoint-flow model 316, and a semantic keypoint tracking module 318. The semantic keypoint detection module 312, the semantic keypoint descriptor module 314, the differentiable keypoint-flow model 316, and the semantic keypoint tracking module 318 may be components of a same or different artificial neural network, such as a keypoint graph neural network (KGNN) communicably coupled to a shared image backbone. The ego perception module 310 is not limited to the KGNN and the shared image backbone. The ego perception module 310 receives a data stream from the first sensor 304 and/or the second sensor 306. The data stream may include a 2D red-green-blue (RGB) image from the first sensor 304 and the light detection and ranging (LIDAR) data points from the second sensor 306. The data stream may include multiple frames, such as image frames. In this configuration, the first sensor 304 captures monocular (single-camera) 2D RGB images.

The ego perception module 310 is configured to perform semantic keypoint detection for the task of tracking semantic keypoints between monocular red-green-blue (RGB) images received from the first sensor 304 or the second sensor 306 for autonomous operation of the car 350. According to aspects of the present disclosure, the semantic keypoint detection module 312 is configured to detect semantic keypoints using a keypoint heatmap from a shared image backbone (not shown). In aspects of the present disclosure, the semantic keypoint descriptor module 314 is trained in a differentiable manner to associate semantic keypoints across subsequent frames of an input video stream. In some aspects of the present disclosure, the semantic keypoint detection module 312 and the semantic keypoint descriptor module 314 form a directed graph of linked semantic keypoints of an object including embedded descriptor headings. In addition, the differentiable keypoint-flow model 316 estimates a directed graph of linked semantic keypoints of the object within a subsequent frame of the input video stream. In this aspect of the present disclosure, the semantic keypoint tracking module 318 compares the estimated directed graph of linked semantic keypoints of an object with a directed graph of linked semantic keypoints generated from the next frame of the video stream to enable autonomous vehicle operation, as shown in FIG. 4.

Aspects of the present disclosure are not limited to an autonomous agent. Aspects of the present disclosure also contemplate an agent operating in a manual mode or a semi-autonomous mode. In the manual mode, a human driver manually operates (e.g., controls) the agent. In the autonomous mode, an agent control system operates the agent without human intervention. In the semi-autonomous mode, the human may operate the agent, and the agent control system may override or assist the human. For example, the agent control system may override the human to prevent a collision or to obey one or more traffic rules.

Figure 4:
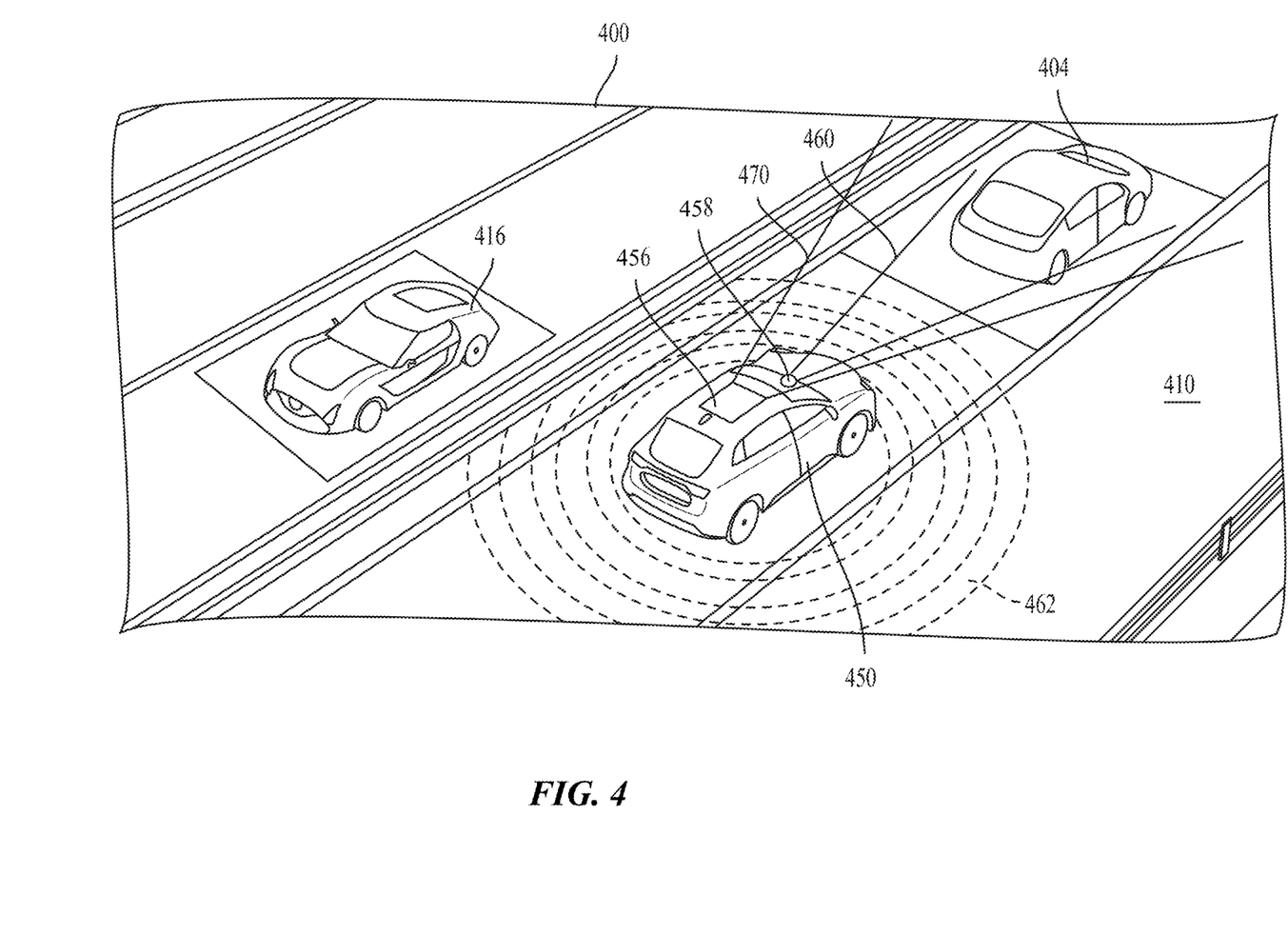
FIG. 4 is a drawing illustrating an example of an ego vehicle in an environment, according to aspects of the present disclosure.

FIG. 4 illustrates an example of an ego vehicle 450 (e.g., the car 350) in an environment 400, according to aspects of the present disclosure. As shown in FIG. 4, the ego vehicle 450 is traveling on a road 410. A first vehicle 404 (e.g., other agent) may be ahead of the ego vehicle 450, and a second vehicle 416 may be adjacent to the ego vehicle 450. In this example, the ego vehicle 450 may include a 2D camera 458, such as a 2D red-green-blue (RGB) camera, and a second sensor 456. The second sensor 456 may be another RGB camera or another type of sensor, such as ultrasound, and/or radio detection and ranging (RADAR), light detection and ranging (LIDAR), as shown by reference number 462. Additionally, or alternatively, the ego vehicle 450 may include one or more additional sensors. For example, the additional sensors may be side facing and/or rear facing sensors.

In one configuration, the 2D camera 458 captures a 2D image that includes objects in the field of view 460 of the 2D camera 458. The second sensor 456 may generate one or more output streams. The 2D image captured by the 2D camera includes a 2D image of the first vehicle 404, as the first vehicle 404 is in the field of view 460 of the 2D camera 458. A field of view 470 of the second sensor 456 is also shown.

The information obtained from the second sensor 456 and the camera 458 may be used to navigate the ego vehicle 450 along a route when the ego vehicle 450 is in an autonomous mode. The second sensor 456 and the camera 458 may be powered from electricity provided from the battery (not shown) of the ego vehicle 450. The battery may also power the motor of the ego vehicle 450. The information obtained from the second sensor 456 and the camera 458 may be used to generate a 3D representation of an environment.

Aspects of the present disclosure are directed to an architecture that includes an end-to-end 2D semantic keypoint detector and tracker using a differentiable keypoint-flow network. In this aspect of the present disclosure, a further model is provided for estimating a geometric structure to provide a rigid-body model for representing an object category and tracking a corresponding object between frames. This architecture includes an estimation model as a cue for semantic keypoint tracking within subsequent frames of a video stream, for example, as shown in FIG. 5.

Figure 5:
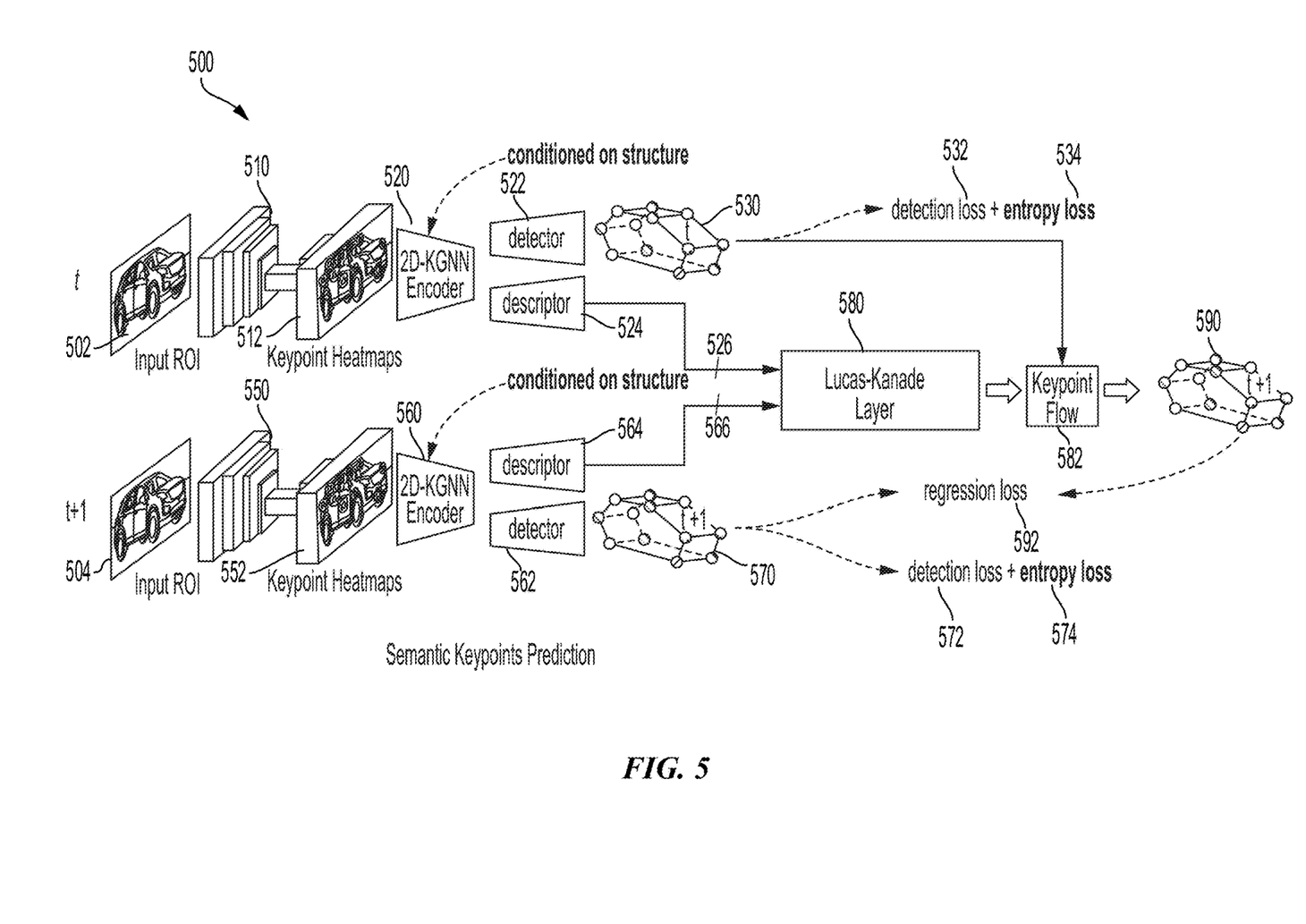
FIG. 5 is a block diagram illustrating a semantic keypoint detection system for linking of the semantic keypoints for learned tracking between images of a video stream, according to aspects of the present disclosure.

FIG. 5 is a block diagram illustrating an architecture that includes an end-to-end 2D semantic keypoint detector and tracker using a differentiable keypoint-flow network, according to aspects of the present disclosure. In one aspect of the present disclosure, a semantic keypoint detection and tracking framework 500 is used to implement the ego perception module 310 shown in FIG. 3 using, for example, a shared matching layer to enable object tracking. In aspects of the present disclosure, a model is provided for estimating a geometric structure to provide a rigid-body model of an object of an object category for tracking the object between frames. This architecture includes an estimation model as a cue for keypoint tracking within subsequent frames of a video stream, as shown in FIG. 5.

In one configuration, the semantic keypoint detection and tracking framework 500 is composed of a first shared image backbone 510. In this configuration, the semantic keypoint detection and tracking framework 500 receives two consecutive frames, a first frame (T) 502 and a next frame (T+1) 504 of a monocular video stream. For example, the first shared image backbone 510 receives the first frame (T) 502 and extracts relevant appearance and geometric features for semantic keypoint extraction by generating a first keypoint heatmap 512. The first keypoint heatmap 512 is provided to a first encoder 520.

In some aspects of the present disclosure, the semantic keypoint detection and tracking framework 500 models detected keypoints using a structured graph neural network to depict the geometry/spatial relationships of a rigid-body object (ex: Car, Bus, Truck, etc.). This structured graph model can be either predefined or learned in the semantic keypoint detection and tracking framework 500. As such, this aspect of the present disclosure adds a graphical representation/model to constrain the geometry between the keypoints in a rigid object, such as a directed keypoint graph.

In some aspects of the present disclosure, the first encoder 520 is a component of a 2D keypoint graph neural network (KGNN) that is conditioned according to a structured graph model of a vehicle. In this configuration, the first encoder 520 of the 2D KGNN is configured to link keypoints in a first 2D graph structure 530 representing an object category of an object in a frame (T) 502 of a video stream. For example, the first 2D graph structure 530 is generated by the first encoder 520 using the first keypoint heatmap 512. A first detector head 522 of the 2D KGNN is trained to detect a semantic meaning for the linked keypoints of the 2D graph structure 530 to form first linked, semantic keypoints in the first 2D graph structure 530 of the object in the first frame (T) 502.

In this configuration, a first descriptor head 524 of the 2D KGNN embeds a descriptor into the first linked, semantic keypoints of the first 2D graph structure 530. According to aspects of the present disclosure, the embed descriptions enable association of the first linked, semantic keypoints of the first 2D graph structure 530 across subsequent frames of the video stream. According to aspects of the present disclosure, the first 2D graph structure 530 is represented by a detection loss 532 and an entropy loss 534. For example, the detection loss 532 may refer to a location (e.g., x, y) of the first linked, semantic keypoints of the first 2D graph structure 530. In addition, the entropy loss 534 may refer to a class (e.g., semantic meaning) of the first linked, semantic keypoints of the first 2D graph structure 530.

In this configuration, the semantic keypoint detection and tracking framework 500 further includes a second shared image backbone 550. In this example, the second shared image backbone 550 receives the next frame (T+1) 504 and extracts relevant appearance and geometric features for semantic keypoint extraction by generating a second keypoint heatmap 552. The second keypoint heatmap 552 is provided to a second encoder 560 of the 2D KGNN. In some aspects of the present disclosure, the second encoder 560 of the 2D KGNN is configured to link keypoints in a second 2D graph structure 570 representing the object category of the object in the next frame (T+1) 504 of the video stream. For example, the second 2D graph structure 570 is generated by the second encoder 560 using the second keypoint heatmap 552. A second detector head of the 2D KGNN is trained to detect a semantic meaning for the linked keypoints of the second 2D graph structure 570 to form second linked, semantic keypoints in the second 2D graph structure 570 of the object in the next frame (T+1) 504.

In this configuration, a second descriptor head 564 of the 2D KGNN embeds a descriptor into the second linked, semantic keypoints of the second 2D graph structure 570. According to aspects of the present disclosure, the embed descriptions enable association of the second linked, semantic keypoints of the second 2D graph structure 570 across subsequent frames of the video stream. According to aspects of the present disclosure, the second 2D graph structure 570 is represented by a detection loss 572 and an entropy loss 574. For example, the detection loss 572 may refer to a location (e.g., x, y) of the second linked, semantic keypoints of the second 2D graph structure 570. In addition, the entropy loss 574 may refer to a class (e.g., semantic meaning) of the second linked, semantic keypoints of the second 2D graph structure 570.

In aspects of the present disclosure, two consecutive images (e.g., the first frame (T) 502 and the next frame (T+1) 504) are used as input to the semantic keypoint and tracking framework 500. In this configuration, a shared matching layer 580 receives a first embedded descriptor 526 of the first linked, semantic keypoints in the first 2D graph structure 530. In addition, the shared matching layer 580 receives a second embedded descriptor 566 of the second linked, semantic keypoints of the second 2D graph structure 570 representing the object in the next frame (T+1) 504 in the video stream.

In some aspects of the present disclosure, a shared differentiable keypoint-flow model 582 generates an estimated 2D graph structure of linked, semantic keypoints of the object in the next frame (T+1) 504. For example, the estimated 2D graph structure is generated based on the first linked, semantic keypoints in the first 2D graph structure 530 of the object in the frame (T) 502. Tracking of the object between the first frame (T) 502 and the next frame (T+1) 504 involves performing a regression loss 592 of the estimated 2D graph structure 590. For example, the regression loss 592 is performed by comparing the estimated 2D graph structure 590 of the object in the next frame (T+1) 504 with the second 2D graph structure of the object in the next frame (T+1) 504. An object tracking process is further described in FIG. 6.

Figure 6:
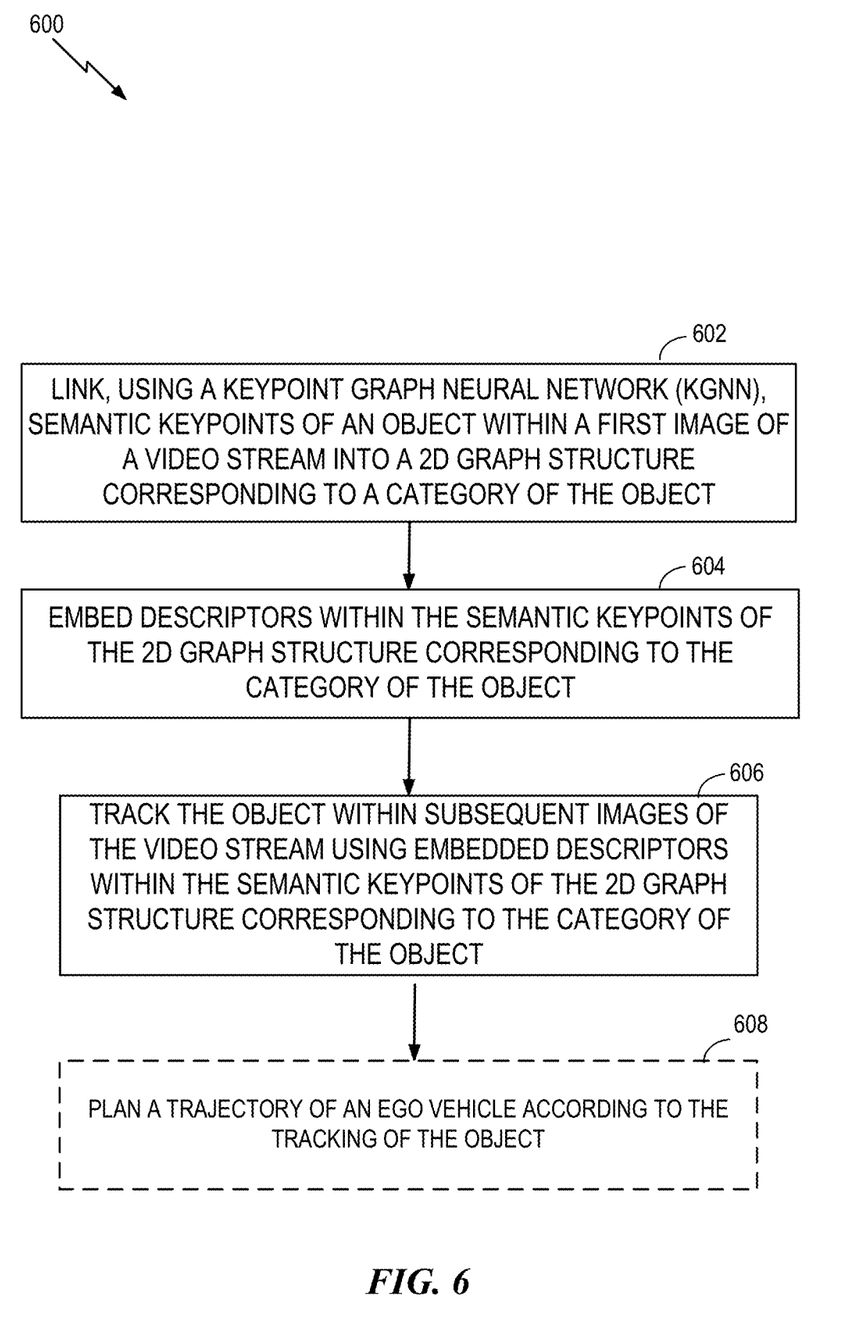
FIG. 6 is a flowchart illustrating a method for semantic keypoint detection and linking of the semantic keypoints for learned tracking, according to aspects of the present disclosure.

FIG. 6 is a flowchart illustrating a method for semantic keypoint detection and tracking, according to aspects of the present disclosure. The method 600 begins at block 602, in which a keypoint graph neural network (KGNN) links semantic keypoints of an object within a first image of a video stream into a 2D graph structure corresponding to a category of the object. For example, as shown in FIG. 5, the first encoder 520 is a component of a 2D keypoint graph neural network (KGNN) that is conditioned according to a structured graph model of a vehicle. In this configuration, the first encoder 520 of the 2D KGNN is configured to link keypoints in a first 2D graph structure 530 representing an object category of an object in a frame (T) 502 of a video stream.

At block 604, descriptors are embedded within the semantic keypoints of the 2D graph structure corresponding to the category of the object. For example, as shown in FIG. 5, in this configuration, a first descriptor head 524 of the 2D KGNN embeds a descriptor into the first linked, semantic keypoints of the first 2D graph structure 530. According to aspects of the present disclosure, the embed descriptions enable association of the first linked, semantic keypoints of the first 2D graph structure 530 across subsequent frames of the video stream.

At block 606, the object is tracked within subsequent images of the video stream using embedded descriptors within the semantic keypoints of the 2D graph structure corresponding to the category of the object. For example, as shown in FIG. 5, tracking of the object between the first frame (T) 502 and the next frame (T+1) 504 involves performing regression loss of the estimated 2D graph structure 590. For example, regression is performed by comparing the estimated 2D graph structure 590 of the object in the next frame (T+1) 504 with the second 2D graph structure of the object in the next frame (T+1) 504. At optional block 608, a trajectory of an ego vehicle is planned based on tracking of the object, for example, as performed by the planner module 330 and/or the controller module 340 shown in FIG. 3. Ego vehicle perception using tracking of linked, semantic keypoints from a single-camera of the car 350 is beneficially improved, according to aspects of the present disclosure.

The method 600 further includes linking the semantic keypoints by linking, using a KGNN encoder, interest keypoints of the object within the first image of the video stream into the 2D graph structure corresponding to the category of the object within the first image of the video stream. The method 600 also links the semantic keypoints by detecting, using a KGNN detector, the semantic keypoints from the linked, interest keypoint within the 2D graph structure corresponding to the category of the object within the first image of the video stream.

The method 600 further includes linking the semantic keypoints by extracting, using a shared image backbone, interest keypoints within the first image of the video stream based on relevant appearance and geometric features of the first image. The method 600 further links the semantic keypoints by generating a keypoint heatmap based on the extracted interest keypoints. The method 600 also includes embedding descriptors by generating descriptors of the semantic keypoints. The method 600 further includes embedding, using a KGNN descriptor head, the generated descriptors within the semantic keypoints of the 2D graph structure.

The method 600 performs tracking of the object by generating an estimated 2D graph structure corresponding to the category of the object in a next image of the video stream. The estimated 2D graph structure is generated according to the embedded descriptors within the semantic keypoints of the 2D graph structure corresponding to the object in the first image and a next 2D graph structure corresponding to the category of the object in the next image of the video stream. The method 600 also includes performing regression loss of the estimated 2D graph structure by comparing the estimated 2D graph structure of the object in a next frame (T+1) with the generated 2D graph structure of the object in the next frame (T+1).

In one aspect of the present disclosure, a semantic keypoint detection and tracking system is composed of a shared image backbone. For example, the shared image backbone extracts relevant appearance and geometric features for semantic keypoint extraction by generating a keypoint heatmap. In some aspects of the present disclosure, the disclosed architecture further includes modeling the detected keypoints by a structured graph neural network to depict the geometry/spatial relationships of a rigid-body object (ex:

Car, Bus, Truck, etc.). This graph model can be either predefined or learned in the proposed end-to-end framework. As such, this aspect of the present disclosure adds a graphical representation/model to constrain the geometry between the keypoints in a rigid object, such as a directed keypoint graph. In some aspects of the present disclosure, the structured graph neural network is a keypoint graph neural network (KGNN).

In some aspects of the present disclosure, the keypoint descriptor head is trained in a differentiable manner by leveraging a differentiable keypoint-flow network. In one aspect of the present disclosure, a differentiable keypoint-flow network is a Lucas-Kanade (LK) layer configured to associate the semantic keypoints across subsequent frames of a video stream. While the differentiable keypoint-flow network is not explicitly trained, the keypoint descriptor head is further refined to enable robust tracking via descriptor embedding produced by the differentiable keypoint-flow network.

In some aspects of the present disclosure, the method 600 may be performed by the system-on-a-chip (SOC) 100 (FIG. 1) or the software architecture 200 (FIG. 2) of the ego vehicle 150 (FIG. 1). That is, each of the elements of method 600 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application-specific integrated circuit (ASIC), a field-programmable gate array signal (FPGA) or other programmable logic device (PLD), discrete gate or transistor logic, discrete hardware components, or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects of the present disclosure, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, digital signal processors (DSPs), and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application-specific integrated circuit (ASIC) with the processor, the bus interface, the user interface, supporting circuitry, and at least a portion of the machine-readable media integrated into a single chip, or with one or more field-programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into read-only memory (RAM) from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects of the present disclosure, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects of the present disclosure, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:
1. A method for semantic keypoint detection, comprising:
linking, using a first keypoint graph neural network (KGNN) encoder, semantic keypoints of an object within a first frame at time T of a video stream into a first 2D graph structure corresponding to a category of the object;

embedding descriptors within the semantic keypoints of the first 2D graph structure corresponding to the category of the object;

linking, using a second KGNN encoder, semantic keypoints in a second 2D graph structure representing the object category of the object in a second frame at time T+1 of the video stream;

generating, using a shared differential keypoint flow model, an estimated second 2D graph structure corresponding to the category of the object in the second frame at time T+1 of the video stream according to the embedded descriptors in the semantic keypoints of the first 2D graph structure; and tracking the object within subsequent frames of the video stream according to a regression loss from comparing, using a shared matching layer, the estimated 2D graph structure according to the embedded descriptor in the semantic keypoints of the first 2D graph structure with the second 2D graph structure of the object in the second frame at time T+1.

2. The method of claim 1, in which linking the semantic keypoints comprises:

linking, using the first KGNN encoder, interest keypoints of the object within the first image of the video stream into the 2D graph structure corresponding to the category of the object within the first frame of the video stream; and detecting, using a first KGNN detector, the semantic keypoints from the linked, interest keypoint within the first 2D graph structure corresponding to the category of the object within the first frame at time T of the video stream.

3. The method of claim 1, in which the first 2D graph structure and the second 2D graph structure are based on a geometric structure of the category associated with the object.

4. The method of claim 1, in which linking comprises:

extracting, using a shared image backbone, interest keypoints within the first frame of the video stream based on relevant appearance and geometric features of the first frame; and generating a keypoint heatmap based on the extracted interest keypoints.

5. The method of claim 1, in which embedding comprises:
generating descriptors of the semantic keypoints; and
embedding, using a first KGNN descriptor head, the generated descriptors within the semantic keypoints of the first 2D graph structure.

6. The method of claim 1, in which the object comprises a vehicle represented by the estimated 2D graph structure to depict geometry/spatial relationships of a rigid-body of the vehicle according to the category of the vehicle.

7. A non-transitory computer-readable medium having program code recorded thereon for semantic keypoint detection, the program code being executed by a processor and comprising:

program code to link, using a first keypoint graph neural network (KGNN) encoder, semantic keypoints of an object within a first frame at time T of a video stream into a first 2D graph structure corresponding to a category of the object;

program code to embed descriptors within the semantic keypoints of the first 2D graph structure corresponding to the category of the object;

linking, using a second KGNN encoder, semantic keypoints in a second 2D graph structure representing the object category of the object in a second frame at time T+1 of the video stream;

program code to generate, using a shared differential keypoint flow model, an estimated second 2D graph structure corresponding to the category of the object in the second frame at time T+1 of the video stream according to the embedded descriptors in the semantic keypoints of the first 2D graph structure; and program code to track the object within subsequent frames of the video stream according to a regression loss from comparing, using a shared matching layer, the estimated 2D graph structure according to the embedded descriptor in the semantic keypoints of the first 2D graph structure with the second 2D graph structure of the object in the second frame at time T+1.

8. The non-transitory computer-readable medium of claim 7, in which linking the semantic keypoints comprises:

program code to link, using the first KGNN encoder, interest keypoints of the object within the first frame of the video stream into the first 2D graph structure corresponding to the category of the object within the first frame of the video stream; and program code to detect, using a first KGNN detector, the semantic keypoints from the linked, interest keypoint within the first 2D graph structure corresponding to the category of the object within the first frame of the video stream.

9. The non-transitory computer-readable medium of claim 7, in which the first 2D graph structure and the second 2D graph structure are based on a geometric structure of the category associated with the object.

10. The non-transitory computer-readable medium of claim 7, in which the program code to link comprises:

program code to extract, using a shared image backbone, interest keypoints within the first frame of the video stream based on relevant appearance and geometric features of the first frame; and program code to generate a keypoint heatmap based on the extracted interest keypoints.

11. The non-transitory computer-readable medium of claim 7, in which the program code to embed comprises:

program code to generate the descriptors of the semantic keypoints; and program code to embed, using a first KGNN descriptor head, the descriptors within the semantic keypoints of the first 2D graph structure.

12. The non-transitory computer-readable medium of claim 7, in which the object comprises a vehicle represented by the estimated 2D graph structure to depict geometry/spatial relationships of a rigid-body of the vehicle according to the category of the vehicle.

13. A system for semantic keypoint detection, the system comprising:

a semantic keypoint detection module to link, using a first keypoint graph neural network (KGNN) encoder, semantic keypoints of an object within a first frame at time T of a video stream into a first 2D graph structure corresponding to a category of the object, and to link, using a second KGNN encoder, semantic keypoints in a second 2D graph structure representing the object category of the object in a second frame at time T+1 of the video stream;

a semantic keypoint descriptor module to embed descriptors within the semantic keypoints of the first 2D graph structure corresponding to the category of the object, and to generate, using a shared differential keypoint flow model, an estimated second 2D graph structure corresponding to the category of the object in the second frame at time T+1 of the video stream according to the embedded descriptors-within in the semantic keypoints of the first 2D graph structure; and a semantic keypoint tracking module to track the object within subsequent frames of the video stream according to a regression loss from comparing, using a shared matching layer, the estimated 2D graph structure according to the embedded descriptor in the semantic keypoints of the first 2D graph structure with the second 2D graph structure of the object in the second frame at time T+1.

14. The system of claim 13, in which the object comprises a vehicle represented by the estimated 2D graph structure to depict geometry/spatial relationships of a rigid-body of the vehicle according to the category of the vehicle.

* * * * *